US009998383B2

(12) United States Patent
Garcia et al.

(10) Patent No.: US 9,998,383 B2
(45) Date of Patent: *Jun. 12, 2018

(54) NETWORK LATENCY OPTIMIZATION

(71) Applicant: Comcast Cable Communications, LLC, Philadelphia, PA (US)

(72) Inventors: Maurice Manuel Garcia, Levittown, PA (US); Richard M. Woundy, North Reading, MA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 98 days.

This patent is subject to a terminal disclaimer.

(21) Appl. No.: 14/880,700

(22) Filed: Oct. 12, 2015

(65) Prior Publication Data

US 2016/0241477 A1 Aug. 18, 2016

Related U.S. Application Data

(63) Continuation of application No. 13/748,980, filed on Jan. 24, 2013, now Pat. No. 9,191,329.

(51) Int. Cl.
*H04L 12/851* (2013.01)
*H04L 12/863* (2013.01)
*H04L 12/801* (2013.01)
*H04L 12/841* (2013.01)
*H04L 12/26* (2006.01)

(52) U.S. Cl.
CPC ...... *H04L 47/2425* (2013.01); *H04L 43/0858* (2013.01); *H04L 47/18* (2013.01); *H04L 47/28* (2013.01); *H04L 47/6295* (2013.01); *H04L 47/14* (2013.01)

(58) Field of Classification Search
None
See application file for complete search history.

(56) References Cited

U.S. PATENT DOCUMENTS

| 7,593,345 | B2 | 9/2009 | Dube et al. |
| 7,924,711 | B2 | 4/2011 | Rosen |
| 8,630,179 | B1 | 1/2014 | Cotter |
| 8,774,232 | B2 | 7/2014 | Smith et al. |
| 2008/0285462 | A1* | 11/2008 | Baker ............... H04W 16/18 370/241 |
| 2012/0236713 | A1 | 9/2012 | Kakadia et al. |

(Continued)

OTHER PUBLICATIONS

European Office Action—EP App 14152387.8—dated Apr. 28, 2016.

(Continued)

*Primary Examiner* — Huy D Vu
*Assistant Examiner* — Hong Shao
(74) *Attorney, Agent, or Firm* — Banner & Witcoff, Ltd.

(57) ABSTRACT

A network may provide latency optimization by configuring respective latency values of one or more network components. A latency manager may receive a request indicative of a maximum latency value of a communications path between two devices, and may determine a particular network latency value. The latency manager may then determine respective endpoint latency values for endpoint devices based on the maximum latency value and network latency values. In addition, buffer characteristics, such as buffer depth at particular devices, may be adjusted in view of the latencies.

20 Claims, 8 Drawing Sheets

(56) References Cited

U.S. PATENT DOCUMENTS

2013/0138800 A1   5/2013 Gelter et al.
2014/0146682 A1   5/2014 Kakadia et al.

OTHER PUBLICATIONS

Extended European Search Report—EP 14152387—dated May 15, 2014.
Gopalan K et al: "Delay budget partitioning to maximize network resource usage efficiency", INFOCOM 2004. Twenty-Third Annual Joint Conference of the IEEE Computer and Communications Societies, IEEE, Piscataway, NJ, USA, vol. 3, Mar. 7, 2004 (Mar. 7, 2004), pp. 2060-2071, XP010740562.
"DOCSIS Best Practices and Guidelines—Cable Modem Buffer Control—CM-GL-Buffer-V01-110915", Sep. 15, 2011 (Sep. 15, 2011), XP055116432, Retrieved from the Internet: URL:http://www.cablelabs.com/wp-content/uploads/specdocs/CM-GL-Buffer-V01-110915.pdf [retrieved on May 6, 2014].
Dijkstra E W: "Note on Two Problems in Connexion With Graphs", Numerische Mathematik, Springer Verlag, Berlin, DE, vol. 1, Jan. 1, 1959 (Jan. 1, 1959), pp. 269-271, XP999837527.
Telecommunication and Internet Protocol Harmonization Over Networks (TIPHON) Release 4; End-to-end Quality of Service in TIPHON Systems; Sep. 2003; ETSI TR 102 024-7 V4.1.1 (Sep. 2003).
QoS Requirements of Network Applications on the Internet; Yan Chen, 2004; Information.Knowledge.System Management 4 (2004) 55-76 IOS Press.

\* cited by examiner

NETWORK LATENCY OPTIMIZATION

CROSS-REFERENCE TO RELATED APPLICATIONS

The present application claims priority to, and is a continuation of, U.S. patent application Ser. No. 13/748,980, which is incorporated by reference herein as to its entirety.

BACKGROUND

Packet-switched communications networks typically employ multiple routers for transmitting and receiving data between devices such as client devices (e.g., computers, servers, smart phones, tablet computing devices, internet-enabled display devices, etc.). However, bufferbloat has become an increasingly pervasive problem in packet-switched computer networks whereby excess buffering of data packets may result in increased latency and jitter, as well as a reduction in the overall network throughput. When bufferbloat is present, high data rate communications, such as latency-sensitive gaming applications, may take too long to complete.

One solution is to use quality of service (QoS) and packet prioritization to transmit higher priority packets ahead of lower priority packets. However, this approach minimizes the delay for high priority packets at the expense of higher delays for other packets. As a result, low priority traffic flows may be susceptible to unacceptable performance if too many packet flows are prioritized. Accordingly, packet prioritization may only be applied to a limited proportion of the network traffic.

Accordingly, there remains a need to improve packet-switched communications, and to balance that need with the strains on the network.

SUMMARY

Some features described herein relate generally to a packet-switched communications network that implements a network traffic management technique to reduce the impact of issues such as incorrectly sized packet buffer queue depths at packet switch interface devices (e.g., routers), along an endpoint-to-endpoint communications path. In some instances, a flow path for a packet data stream may be selected based on the latency at each node in the endpoint-to-endpoint communications path rather than available bandwidth at each node.

In some embodiments, a computing device may receive a request indicative of a maximum latency value (e.g., for an application or service, such as a Voice Over Internet Protocol (VOIP) service, an online gaming service, or a subscription service tier, etc.) of an endpoint-to-endpoint communications path between two devices. The endpoint-to-endpoint communications path may comprise a network communications path between endpoint interface devices respectively coupled to each of the devices.

A computing device may determine a network latency value indicative of the latency of a network communications path. For example, the computing device may request and receive the network latency value from a remote server. In another example, the computing device may determine the network latency value based on the respective latency values of packet switch interface devices in a particular network communications path, and other characteristics such as parameters related to corresponding communications links.

In another aspect, a computing device may determine respective endpoint latency values for each of any number of endpoint interface devices in a particular endpoint-to-endpoint communications path based on factors such as a predetermined maximum latency value and a network latency value being considered. For example, the computing device may determine a combined endpoint latency value based on the difference of the reference maximum latency value and a latency value for the relevant portion of the network, such as between two or more nodes or devices in the network. The computing device may then, for example, determine respective endpoint latency values whose sum is equal to or less than the combined endpoint latency value. The computing device may subsequently transmit an instruction to configure the respective latency values of the devices, such as endpoint interface devices, based on the determined endpoint latency values.

In some aspects, the computing device may monitor a particular network communications path to determine whether a network impact event, such as a link or device failure, has occurred. As a result of determining that a network impact event has occurred, the computing device may trigger a review, e.g., the determination or re-determination, of the network latency value and the endpoint latency values.

In other aspects, the computing device may enable (e.g., configure, generate, etc.) the network communications path based on a comparison of a plurality of network communications paths. For example, the computing device may compare the respective network latency values of a plurality of network communications paths and enable the network communications path to be included in the endpoint-to-endpoint communications path, for example, based on the path having the lowest network latency value.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
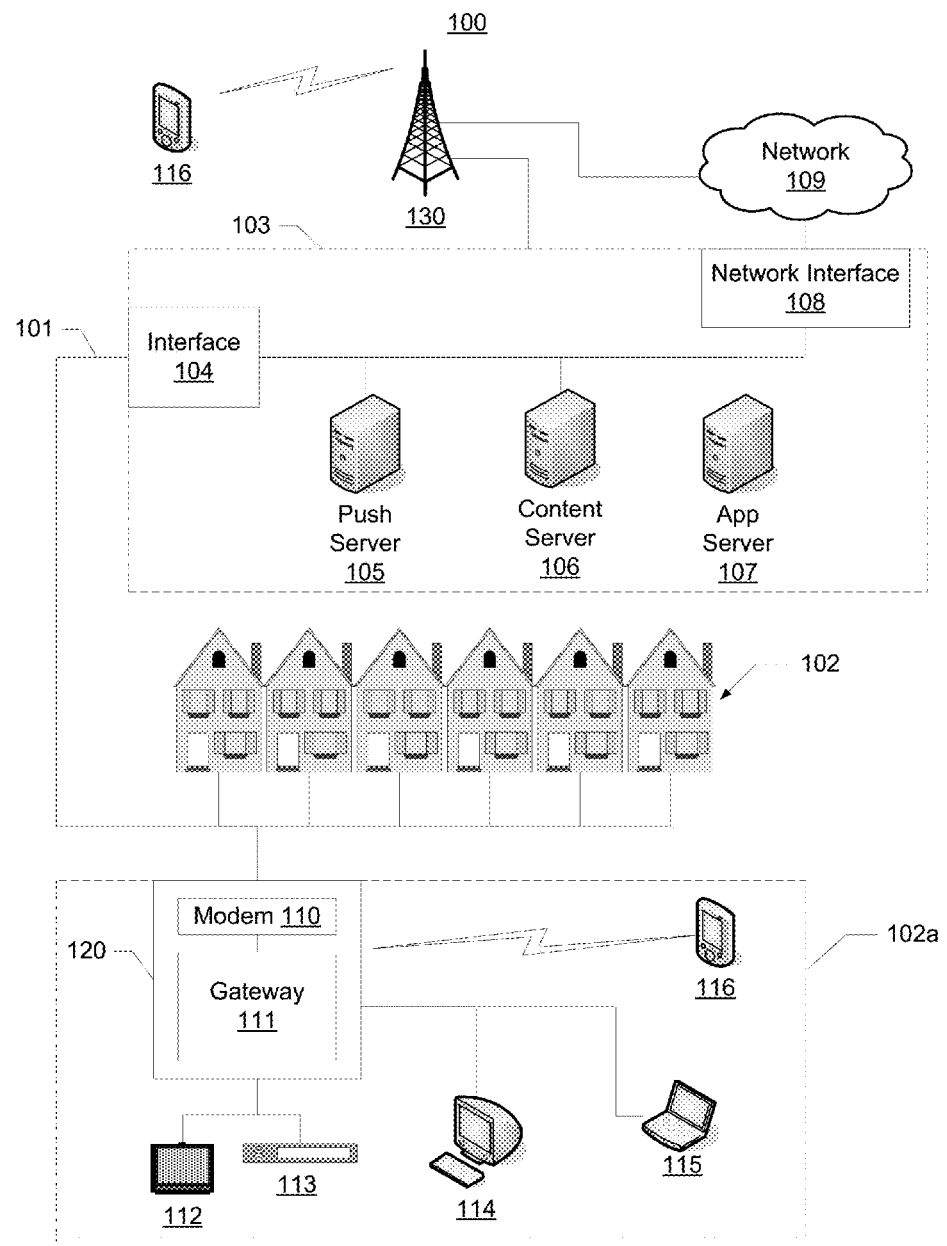
FIG. 1 illustrates an example network environment.

FIG. 1 illustrates an example information distribution network 100 in which many of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

Network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other type of information distribution network or combination of networks. For example, network 100 may be a cellular broadband network communicating with multiple communications access points, such as wireless communications tower 130. In another example, network 100 may be a coaxial system comprising a cable modem termination system (CMTS) communicating with numerous gateway interface devices (e.g., gateway interface device 111 in example home 102*a*). In another example, the network 100 may be a fiber-optic system comprising optical fibers extending from an optical line terminal (OLT) to numerous optical network terminals (ONTs) communicatively coupled with various gateway interface devices. In another example, the network 100 may be a digital subscriber line (DSL) system that includes local office 103 communicating with numerous gateway interface devices. In another example, network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

Network 100 may use a series of interconnected communication links 101 (e.g., coaxial cables, optical fibers, wireless links, etc.) to connect premises such as homes 102 or other user environments to local office 103. Communication links 101 may include any wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other components for communicating data. Data may include, for example, internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

Local office 103 may transmit downstream information signals onto communication links 101, and premises such as home 102 may receive and process those signals. In certain implementations, communication links 101 may originate from local office 103 as a single communications path, and may be split into any number of communication links to distribute data to homes 102 and various other destinations.

Although the term home is used by way of example, homes 102 may include any type of user environment, such as single family homes, apartment complexes, businesses, schools, hospitals, parks, and other environments and combinations of environments.

Local office 103 may include interface 104, which may be a computing device configured to manage communications between devices on the network of communication links 101 and backend devices, such as server 105, server 106, and server 107. For example, interface 104 may be a cable modem termination system (CMTS). The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in homes 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks.

Local office 103 may include a variety of servers that may be configured to perform various functions. Local office 103 may include one or more push servers 105 for generating push notifications to deliver data, instructions, or both to devices that are configured to detect such notifications. Local office 103 may include one or more content servers 106 configured to provide content (e.g., media content) to devices. Local office 103 may include one or more application servers 107.

Homes 102 such as home 102*a* may include an interface 120, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other device or combination of devices. In certain implementations, device 110 may be a part of, or communicatively coupled to, gateway interface device 111. Gateway 111 may be, for example, a wireless router, a set-top box, a computer server, or any other computing device or combination.

Gateway interface device 111 may be any computing device for communicating with device 110 to allow one or more other devices in example home 102*a* to communicate with local office 103, one or more external networks 109, or other devices communicatively coupled thereto. Gateway 111 may include local network interfaces to provide communication signals to client devices in or near example home 102*a*, such as television 112, set-top box 113, personal computer 114, laptop computer 115, wireless device 116 (e.g., a wireless laptop, a tablet computer, a mobile phone, a portable gaming device), vehicular computing system 117 (e.g., a mobile computing system, navigation system, or entertainment system in an automobile, marine vessel, or aircraft) and any other device.

Figure 2:
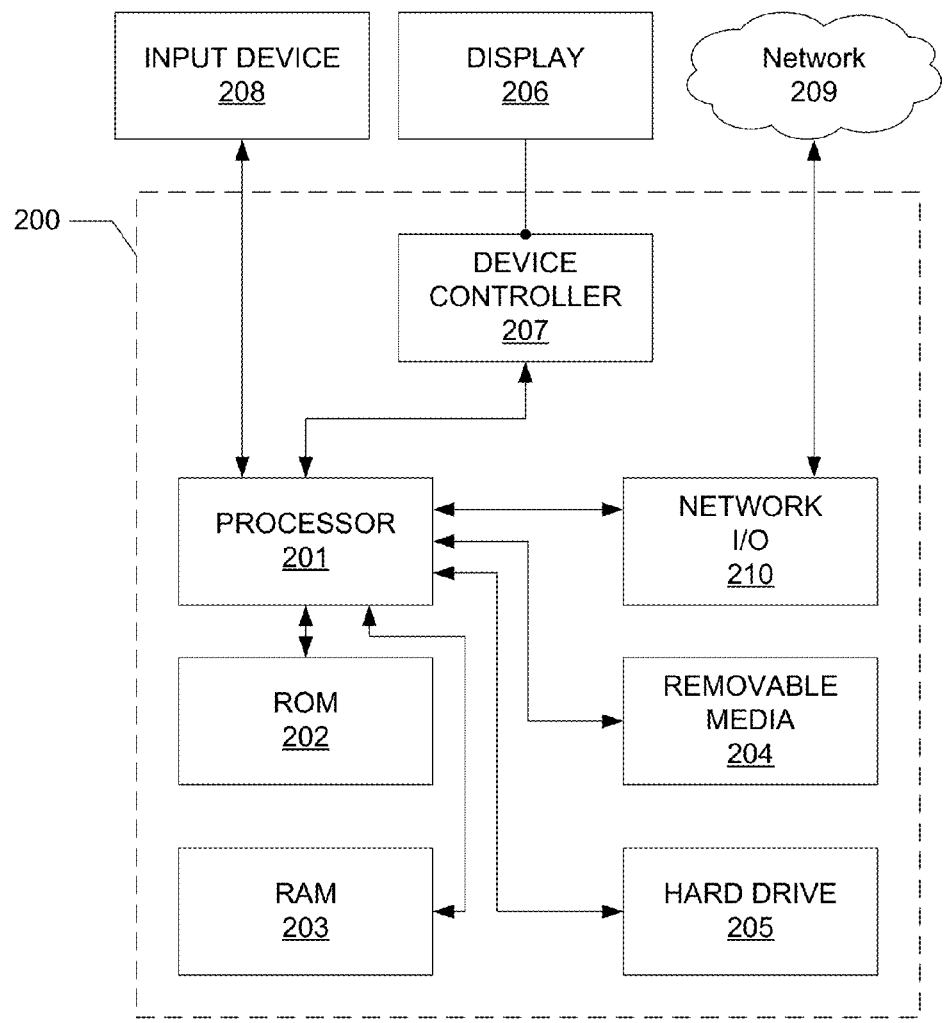
FIG. 2 illustrates an example software and hardware device on which various elements described herein can be implemented.

FIG. 2 illustrates general hardware elements and software elements that can be used to implement any of the various computing devices and/or software discussed herein. Device 200 may include one or more processors 201, which may execute instructions of a computer program to perform any of the functions and steps described herein. The instructions may be stored in any type of computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

Device 200 may include one or more output devices, such as a display 206, such as an external monitor or television, and may include one or more output device controllers 207, such as a video processor. In some embodiments, device 200 may include one or more user input devices 208, such as a remote control, keyboard, mouse, touch screen, microphone, or any other input device.

Device 200 may also include one or more network interfaces, such as network input/output (I/O) interface 210 to communicate with an external network 209. The network interface may be a wired interface, wireless interface, or a combination of the two. In some embodiments, network I/O interface 210 may include a cable modem, and network 209 may include the communication links 101 shown in FIG. 1, one or more external networks 109, an in-home network, a provider's wireless, coaxial, fiber, or hybrid fiber/coaxial distribution system (e.g., a DOCSIS network), or any other desired network.

Figure 3A:
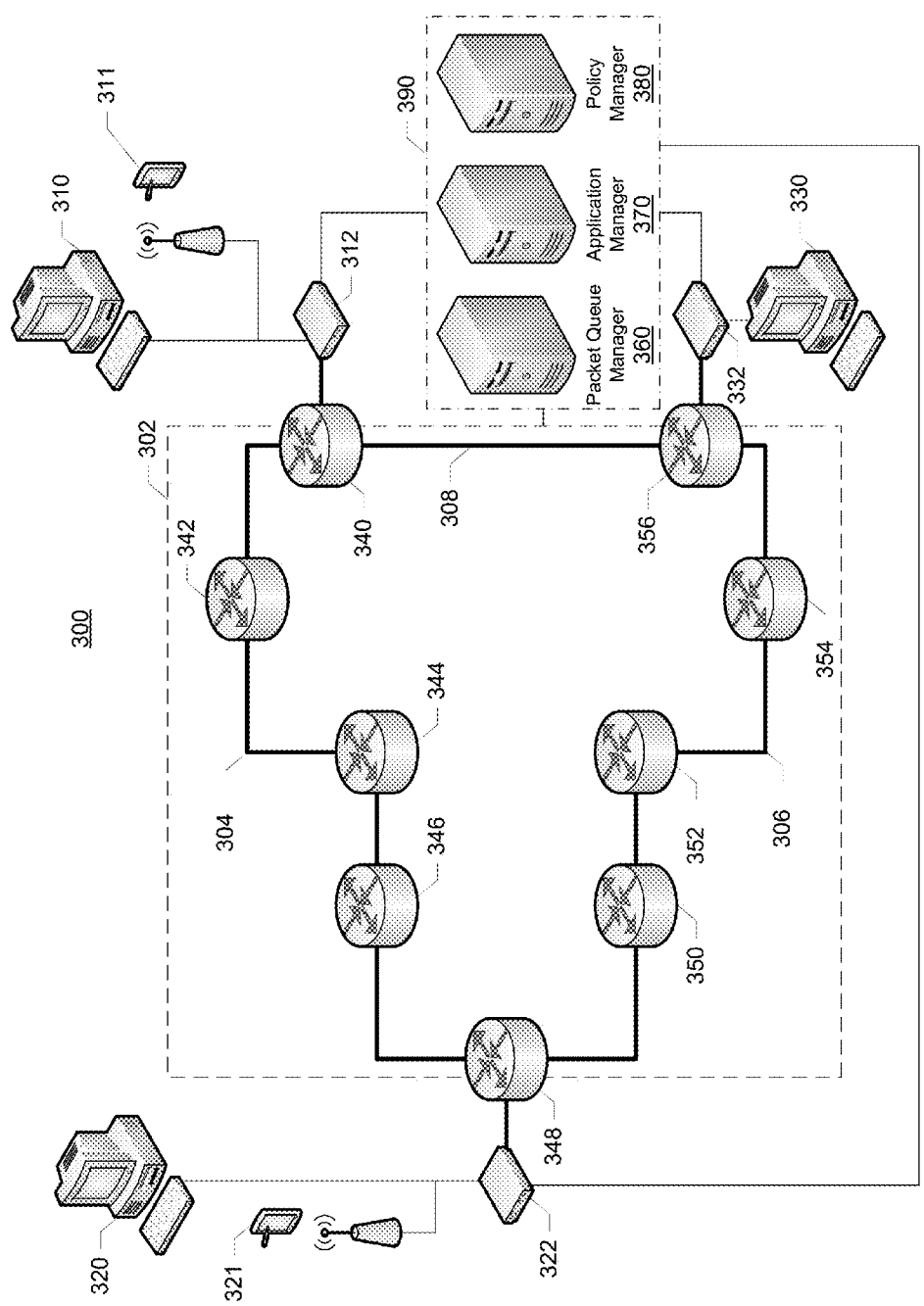
FIGS. 3A-3C illustrate example network environments for providing latency optimization in accordance with some aspects of the disclosure.
Figure 3B:
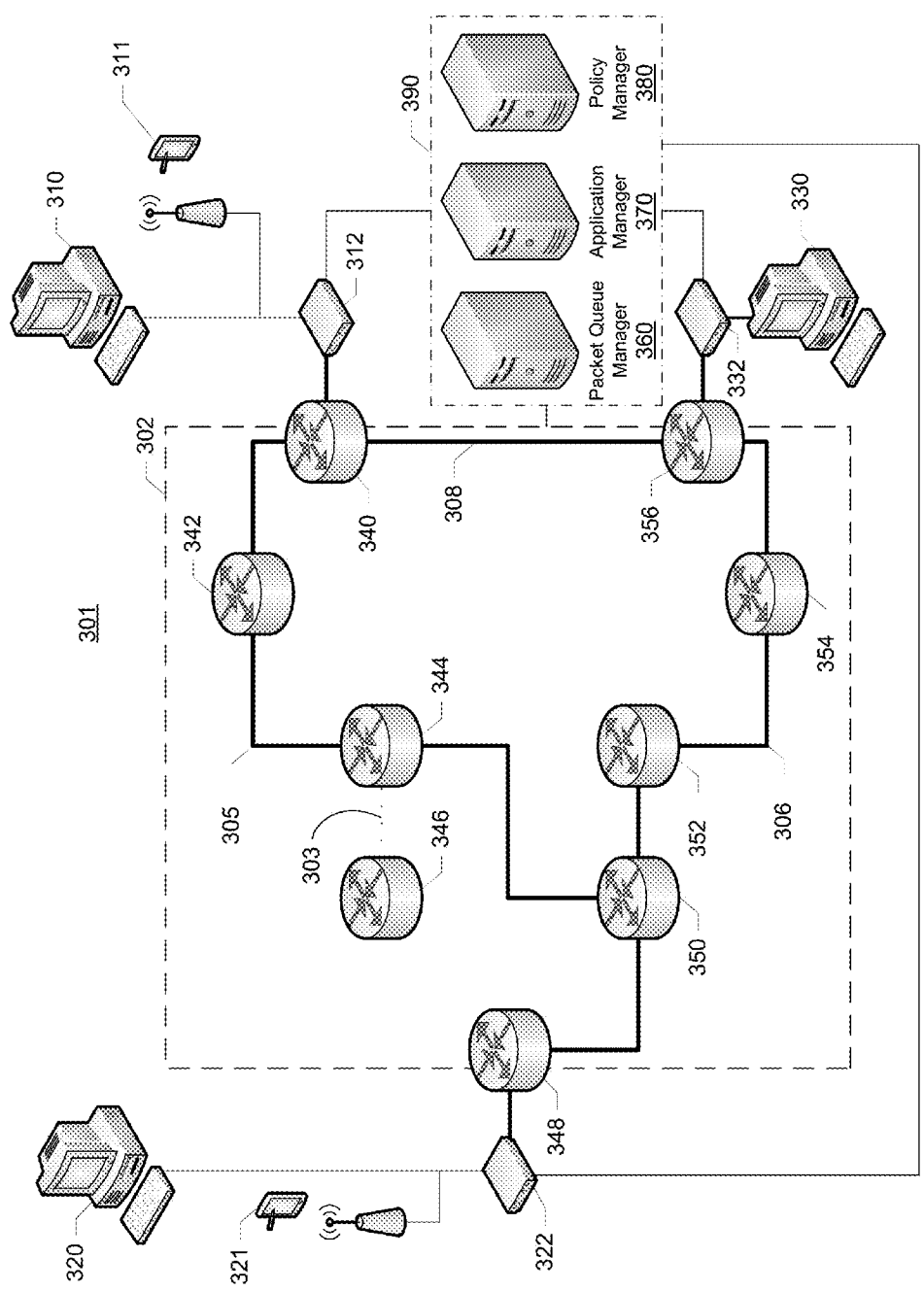
Figure 3C:
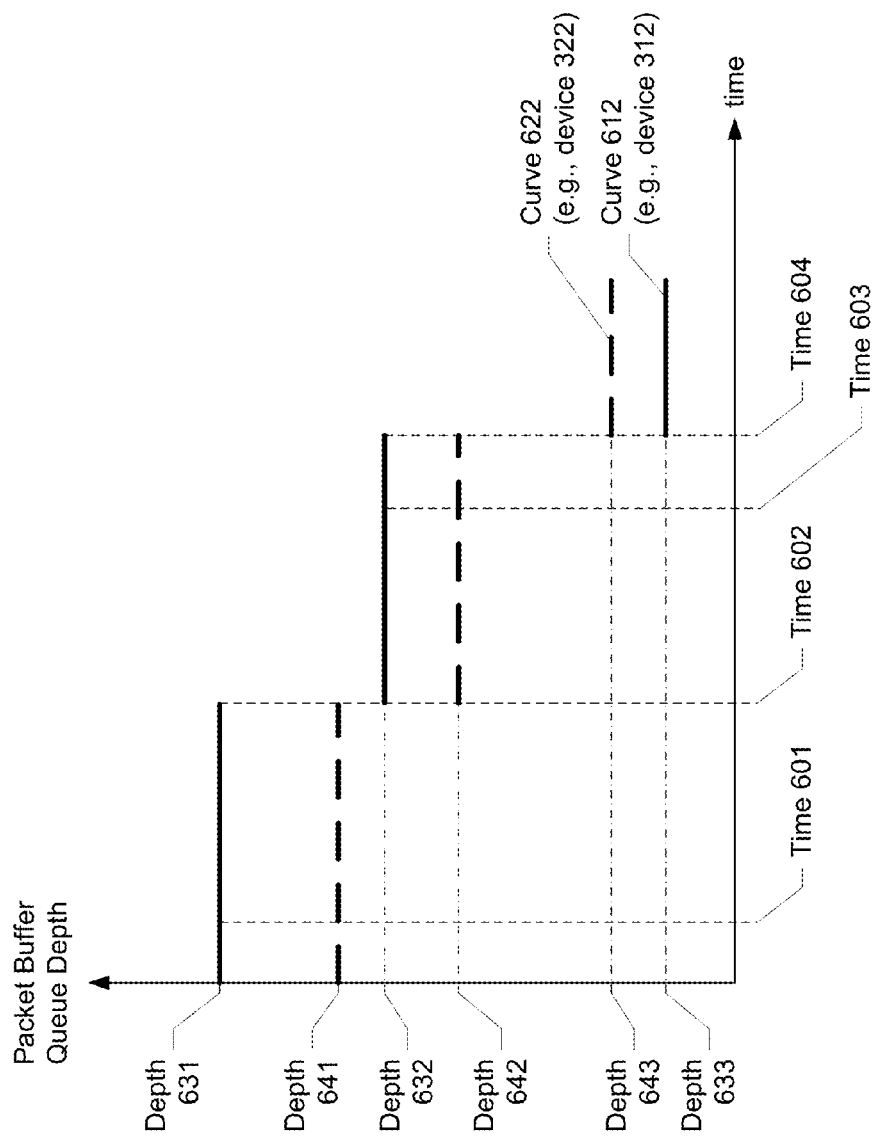

FIG. 3A and FIG. 3B illustrate example systems 300 and 301, respectively, for providing latency optimization between computing devices by controlling the respective latency values of one or more network components as shown in FIG. 3C. In some instances, systems 300 and 301 may allow for an increased reliability in providing a maximum latency guarantee based on, for example, a VOIP communications service, a request from a gaming application, or a user's subscription to a particular service tier. The various components shown in FIGS. 3A-3C may be implemented using any hardware, software, or both, such as device 200 shown in FIG. 2, and may be communicatively coupled using any communications links, such as communications links 101 shown in FIG. 1.

System 300 may include one or more computing devices 310, 320 and 330 and/or wireless devices 311 and 321 whose communications travel through packet-switched communications network 302 (e.g., via endpoint interface devices 312, 322 and 332). Network 302 may include any combination of features described with reference to network 100 shown in FIG. 1, or any other network or combination of networks. For example, network 302 may be a multi-service operator (MSO) network. Each of computing devices 310, 320 and 330 or wireless devices 311 and 321 may be, for example, devices such as client devices. Alternatively, one or more of computing devices 310, 320 and 330 may be a server, such as a cache server or an application server. For example, computing device 320 may be an online gaming server that provides a gaming environment to computing devices 310 and 330 for use in playing a multiplayer video game, such as a massively multiplayer online game. Each of endpoint interface devices 312, 322 and 332 may be, for example, a modem, a customer network endpoint device, an interface device (e.g., interface device 120, device 110, gateway 111 shown in FIG. 1), or any other component or combination of components.

Network 302 may include one or more packet switch interface devices (e.g., routers), servers, and endpoint interface devices (e.g., modems) through which communications such as packet data streams may be transmitted and received. For example, network 302 may include packet switch interface devices 340, 342, 344, 346, 348, 350, 352, 354 and 356. Device 340 may be part of, for example, an endpoint server communicatively coupled to endpoint interface device 312 for communicating with computing device 310. Device 348 may be part of, for example, an endpoint server communicatively coupled to endpoint interface device 322 for communicating with computing device 320. Device 356 may be part of, for example, an endpoint server communicatively coupled to endpoint interface device 332 for communicating with computing device 330.

Computing devices 310, 320 and 330 and/or wireless devices 311 and 321 may communicate with each other via any endpoint-to-endpoint communications path. For example, endpoint-to-endpoint communications path 304 may be a flow path for transmitting and receiving packet data streams between computing devices 310 and 320. Communications path 304 may include, for example: computing device 310; endpoint interface device 312; devices 340, 342, 344, 346, and 348; endpoint interface device 322; and computing device 320.

In another example, endpoint-to-endpoint communications path 306 may be a flow path for transmitting and receiving packet data streams between computing devices 320 and 330. Communications path 306 may include, for example: computing device 320; endpoint interface device 322; devices 348, 350, 352, 354, and 356; endpoint interface device 332; and computing device 330.

In another example, endpoint-to-endpoint communications path 308 may be a flow path for transmitting and receiving packet data streams between computing devices 310 and 330. Communications path 308 may include, for example: computing device 310; endpoint interface device 312; devices 340 and 356; endpoint interface device 332; and computing device 330.

System 300 may include latency manager 390 for optimizing an endpoint-to-endpoint communications path by controlling the respective latency values of various components in the communications path. For example, latency manager 390 may include one or more servers for determining endpoint latency requirements (e.g., one or more endpoint latency values) for the endpoint interface devices in an endpoint-to-endpoint communications path and adjusting their respective packet buffer queue depths (e.g., minimum and maximum packet buffer queue depths) to acquire the endpoint latency requirements. In another example, latency manager 390 may include one or more servers for configuring a packet data stream or set of packet data streams by modifying the minimum and maximum packet buffer queue depths of the devices along the network communications path. Configuration of the respective latency values of various devices will be discussed further with reference to FIG. 3C.

In some embodiments, latency manager 390 may include packet queue manager (PQM) 360, application manager 370 and policy manager 380, which may each be computing devices such as servers. Application manager 370 and policy manager 380 may be communicatively coupled to one or more of the endpoint interface devices in system 300, while packet queue manager 360 may be communicatively coupled to all of the devices in network 302 but need not be a part of network 302. In other embodiments, latency manager 390 may be a single computing device that provides the combined functionality of packet queue manager 360, application manager 370 and policy manager 380. In other embodiments, the functionality of packet queue manager 360 and application manager 370 may be incorporated into the devices of network 302 via an election process between the devices to become the master. A separate server, such as policy manager 380, may be implemented to authorize any determined optimizations or configurations to the various components in system 300. For example, policy manager 380 may authorize changes in packet buffer queue depths for endpoint interface devices associated with a particular service level or subscription.

Application manager 370 may receive a network optimization request from an end user computing device or an application server communicatively coupled to network 302 through an external network such as the Internet. A network optimization request may be a request that includes, for example, latency requirements (e.g., of an application, an online gaming server, or a service tier subscribed to by a user) for an endpoint-to-endpoint communications path between two computing devices. For example, a gaming application may specify that it requires a maximum endpoint-to-endpoint latency value of no more than 70 milliseconds for packets. In another example, a VOIP application may be associated with a maximum one-way latency value of 175 milliseconds. Application manager 370 may process the network optimization request to determine the requested latency requirements. The requested latency requirements may specify, for example, a maximum latency value, packet loss requirements, or both for the endpoint-to-endpoint communications path.

Application manager 370 may determine a respective endpoint latency value for each of the endpoint interface devices in the endpoint-to-endpoint communications path to acquire a latency value less than or equal to the maximum latency value. For example, the latency of the endpoint-to-endpoint communications path $L_{path}$ may be dominated by the network latency value $L_{network}$ of the portion of the endpoint-to-endpoint communications path that passes through network 302 (i.e., the so-called "network communications path") and the combined endpoint latency value $L_{endpoints}$ which may correspond to a sum of the latency values of the endpoint interface devices. Accordingly, application manager 370 may determine the combined endpoint latency value in accordance with the inequality shown in Equation 1:

$$L_{endpoints} \leq L_{max} - L_{network} \quad (1)$$

Application manager 370 may transmit a request to packet queue manager 360 for the network latency value of, for example, the portion of communications path 304 between device 340 and device 348. Packet queue manager 360 may receive the request and determine the network latency value based on, for example, a baseline network latency value, a measured network latency value, or both. Packet queue manager 360 may determine the baseline network latency value based on a predetermined latency value corresponding to the network latency in the absence of congestion or traffic load. Packet queue manager 360 may determine the measured network latency value based on the respective latency values received from each of the devices and the latency values of their corresponding communications links. Packet queue manager 360 may determine the respective latency values of the devices and their corresponding communications links using, for example, a ping technique. In certain implementations, packet queue manager 360 may receive a respective latency value from each of the devices along the network communications path included in the endpoint-to-endpoint communications path. For example, devices 340, 342, 344, 346 and 348 may report their respective latency values (e.g., average packet in/out in microseconds) to packet queue manager 360 for use in determining the network latency value associated with endpoint-to-endpoint communications path 304.

Packet queue manager 360 may transmit the network latency value to application manager 370. Application manager 370 may receive the network latency value from packet queue manager 360 and determine one or more respective endpoint latency values for one or more of the endpoint interface devices based on, for example, the combined endpoint latency value.

Application manager 370 may transmit the endpoint latency requirements (e.g., the one or more latency values) to policy manager 380. Policy manager 380 may receive the endpoint latency requirements from application manager 370 and transmit instructions to one or more of the endpoint interface devices to configure their respective latency values based on the endpoint latency requirements. For example, policy manager 380 may transmit a PacketCable MultiMedia (PCMM) instruction to each of endpoint interface devices 312 and 322 to adjust their respective packet buffer queue depths to acquire the endpoint latency requirements received from application manager 370.

In an example, application manager 370 may receive a network optimization request from an online gaming server indicative of a maximum latency requirement of 20 milliseconds for endpoint-to-endpoint communications path 304. Application manager 370 may transmit a request to packet queue manager 360 for a network latency value of the portion of communications path 304 that passes through network 302. Packet queue manager 360 may determine that the network latency value is 3 milliseconds based on a sum of the respective latency values of devices 340, 342, 344, 346 and 348 and the corresponding communications links. Application manager 370 may receive the network latency value and determine a combined endpoint latency value of 17 milliseconds for endpoint interface devices 312 and 322 based on the difference between the maximum latency value and the network latency value. Application manager 370 may determine endpoint latency values for devices 312 and 322 based on, for example, the combined endpoint latency value of 17 milliseconds.

In some instances, application manager 370 may determine the endpoint latency values based on the type of computing device to which each endpoint interface device is coupled. For example, computing device 310 may be a server and computing device 320 may be a personal computer. Accordingly, application manager 370 may determine a first endpoint latency value for endpoint interface device 322 and a second endpoint latency value (e.g., different from the first endpoint latency value) for endpoint interface device 312 based on the combined endpoint latency value.

In some embodiments, packet queue manager 360 may measure and automatically adjust the packet buffer queue depths of the respective devices to optimize the network's packet data stream traffic on a per-service-flow basis. For example, packet queue manager 360 may establish a baseline-generated Internet Protocol (IP) packet data stream (e.g., endpoint-to-endpoint communications path 304) between the two endpoints of the communications path to determine the changes needed to acquire the desired rate and network delay determined from a received network optimization request. Packet queue manager 360 may generate the endpoint-to-endpoint communications path using routing protocols used in network 302. In some instances, packet queue manager 360 may configure the packet buffer queue depths at each of the devices (e.g., devices 340, 342, 344, 346 and 348).

As illustrated in FIG. 3B, packet queue manager 360 may monitor the network communications path using a background monitoring process to determine whether a network impact event has occurred. A network impact event may be, for example, a communications link failure, an increase in latency beyond a threshold value. The threshold value may be, for example, a pre-determined threshold value (e.g., 1 millisecond), a percentage (e.g., 120 percent) of a running mean of the latency values of the communications links in network 302. For example, packet queue manager 360 may determine that a network impact event has occurred based on network impact 303, which may be a communications link failure or a communications link latency increase beyond a threshold value. In some embodiments, packet queue manager 360 may periodically monitor the network latency value and determine that a network impact event has occurred if the network latency value is greater than the maximum latency value. If so, packet queue manager 360 may trigger the determination and transmission of the network latency value to application manager 370.

In some embodiments, after determining that a network impact event has occurred, packet queue manager 360 may initiate a process to compare the respective network latency values of various alternate network communications paths. Based on the comparison, packet queue manager 360 may generate, for example, communications path 305 (e.g., including devices 340, 342, 344, 350 and 348). For example, communications path 305 may be the endpoint-to-endpoint communications path with the lowest actual or estimated network latency value. Application manager 370 may receive the network latency value from packet queue manager 360 and determine the respective endpoint latency values of endpoint interface devices 312 and 322 based on the network latency value received in response to network impact event 303. Application manager 370 may then transmit the respective endpoint latency values to policy manager 380 for use in adjusting the packet queue buffer sizes of endpoint interface devices 312 and 322.

As illustrated in FIG. 3C, the packet buffer queue depths of two devices may be adjusted based on a requested maximum latency value, a network impact event, or both. Curve 612 illustrates the packet buffer queue depth of one endpoint device (e.g., device 312), and curve 622 illustrates the packet buffer queue depth of another endpoint device (e.g., device 322). At time 601, a computing device such as latency manager 390 may receive a request indicative of a maximum latency requirement for an endpoint-to-endpoint communications path, such as path 304. Latency manger 390 may determine the respective endpoint latency values for the two devices needed to acquire the maximum latency value. At time 602, latency manager 390 may transmit an instruction for the two endpoint devices to adjust their packet buffer queue depths from depths 631 and 641 to depths 632 and 642, respectively, based on the endpoint latency values. At time 603, latency manager 390 may determine that a network impact event has occurred, such as a communications link failure. Latency manager 390 may generate a new communications path, such as path 305, and determine the respective endpoint latency values for the two devices needed to acquire the maximum latency value. At time 604, latency manager 390 may transmit an instruction for the two endpoint devices to adjust their packet buffer queue depths from depths 632 and 642 to depths 633 and 643, respectively, based on the endpoint latency values.

In some aspects, the physical arrangement of the components in systems 300 and 301 may be different than the arrangements shown in FIGS. 3A-3C. For example, each of the components may be coupled through one or more communications networks, such as one or more external networks 109 shown in FIG. 1, via a respective router. The routers may contain, for example, the necessary routing tables and address information to transmit messages to other devices coupled to the one or more communication networks.

Figure 4:
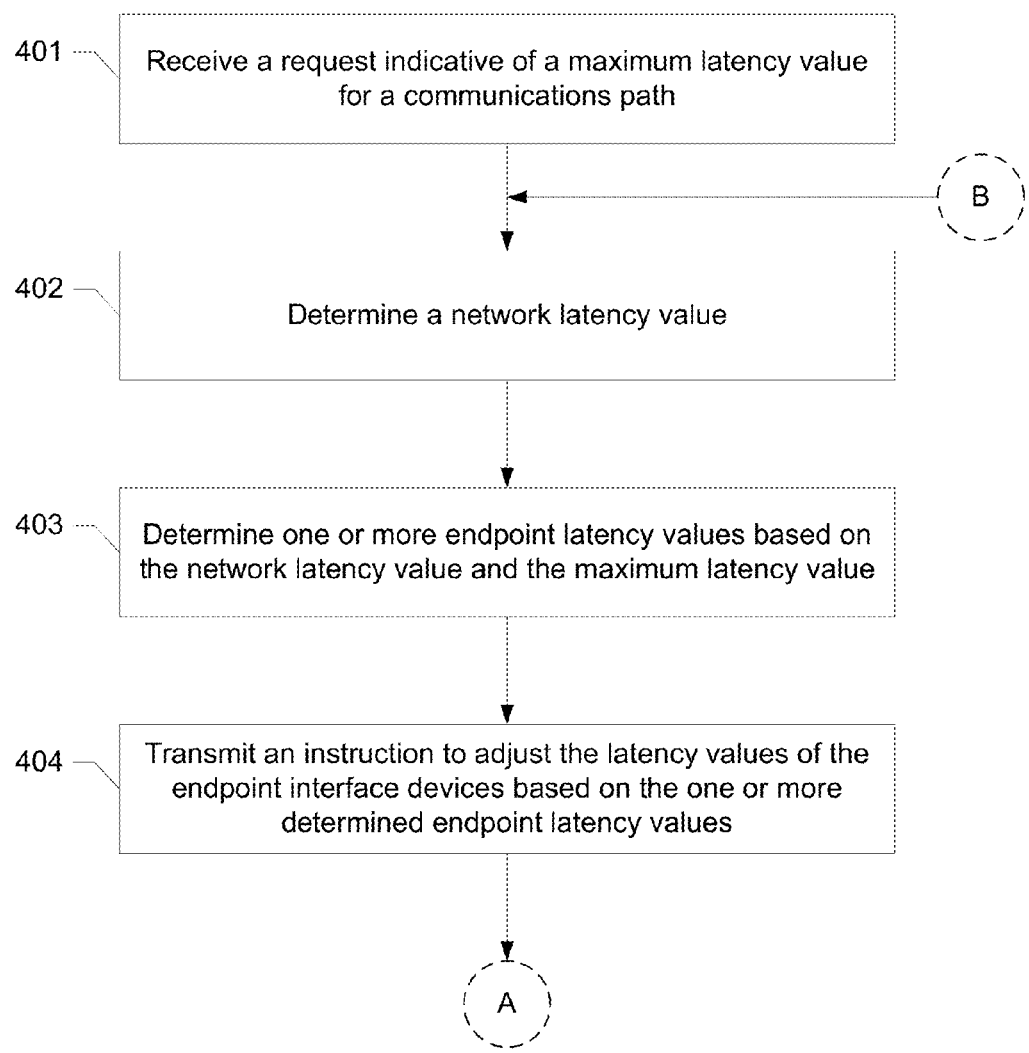
FIG. 4 illustrates an example process flow for providing latency optimization in accordance with some aspects of the disclosure.

FIG. 4 illustrates an example process flow for providing latency optimization, such as the endpoint-to-endpoint latency optimization described with reference to FIGS. 3A-3C, in accordance with some aspects of the disclosure.

At step 401, the latency manager (e.g., latency manager 390) receives a request indicative of a maximum latency value for an endpoint-to-endpoint communications path between endpoint interface devices.

At step 402, the latency manager determines a network latency value indicative of the latency of a network communications path included in the endpoint-to-endpoint communications path. The latency manager may determine the network latency value using, for example, the techniques described with reference to packet queue manager 360 shown in FIGS. 3A-3C.

At step 403, the latency manager determines one or more respective endpoint latency values for one or more of the endpoint interface devices (e.g., devices 312 and 322) based on the network latency value and the maximum latency value. The latency manager may determine the one or more endpoint latency values using, for example, the techniques described with reference to application manager 370 shown in FIGS. 3A-3C.

At step 404, the latency manager transmits an instruction to adjust the respective latency values (e.g., the minimum and maximum packet buffer queue sizes) of the endpoint interface devices based on the one or more determined endpoint latency values. The latency manager may transmit the instruction by transmitting, for example, the one or more determined endpoint latency values to policy server 380 shown in FIGS. 3A-3C for use in adjusting the latency values of the endpoint interface devices. After step 404, the process may proceed to optional step A, which is discussed with reference to FIG. 5.

Figure 5:
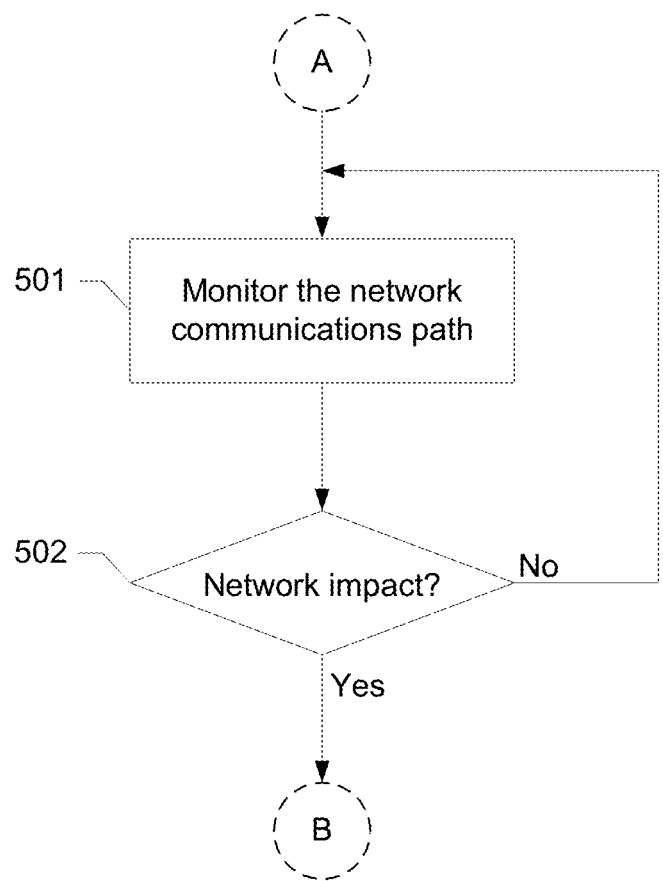
FIG. 5 illustrates another example process flow for providing endpoint-to-endpoint latency optimization in accordance with some aspects of the disclosure.

FIG. 5 illustrates another example process flow for providing latency optimization in accordance with some aspects of the disclosure.

At step 501, the latency manager monitors the network communications path for which the network latency value was determined in step 402. For example, the latency manager may monitor the network communications path using a background monitoring technique as described with reference to packet queue manager 360 shown in FIGS. 3A-3C.

At step 502, the latency manager determines whether a network impact event has occurred using, for example, the techniques described with reference to packet queue manager 360 shown in FIGS. 3A-3C. If the latency manager determines that a network impact event has not occurred, the process may return to step 501 and monitoring of the network communications path may continue. If the latency manager determines that a network impact event has occurred, the process may proceed to optional step B and return to the process flow of FIG. 4.

Figure 6:
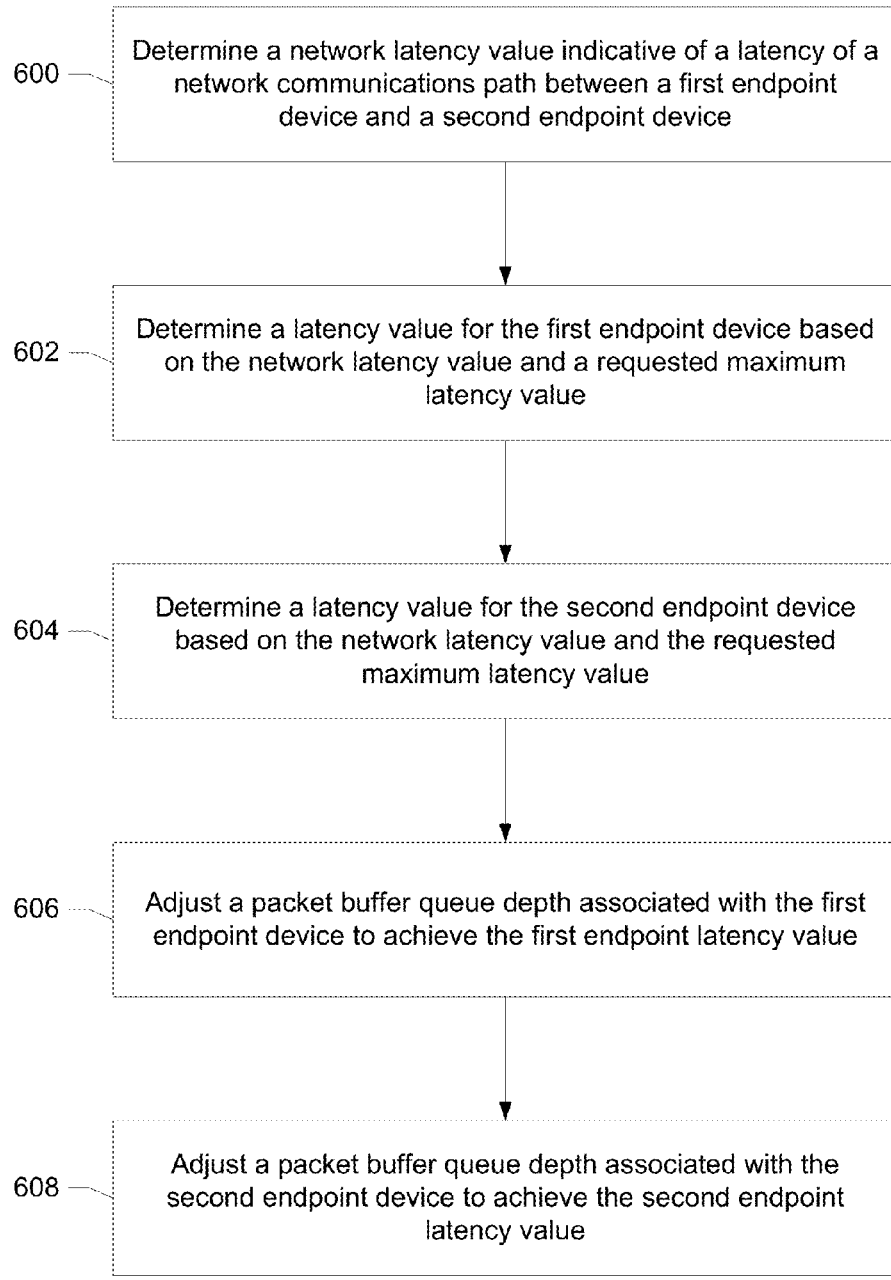
FIG. 6 illustrates an example process flow for adjusting one or more packet buffer queue depths in accordance with some aspects of the disclosure.

FIG. 6 illustrates an example process flow for adjusting one or more packet buffer queue depths in accordance with some aspects of the disclosure. Referring to FIG. 6, at step 600 a network latency value indicative of a latency of a network communications path between a first endpoint device and a second endpoint device may be determined. For example, a computing device, such as or including latency manager 390 may determine a network latency value for path 304. At step 602, a latency value for the first endpoint device may be determined based on the network latency value and a requested maximum latency value. For example, latency manager 390 may determine a latency value for device 322 based on the network latency value for path 304 and a requested maximum latency value. At step 604, a latency value for the second endpoint device may be determined based on the network latency value and the requested maximum latency value. For example, latency manager 390 may determine a latency value for device 312 based on the network latency value for path 304 and a requested maximum latency value. At step 606, a packet buffer depth queue associated with the first endpoint device may be adjusted to achieve the first endpoint latency value. For example, a packet buffer depth queue associated with device 322 may be adjusted from depth 631 to depth 632 (FIG. 3C). At step 608, a packet buffer depth queue associated with the second endpoint device may be adjusted to achieve the second latency value. For example, a packet buffer depth queue associated with device 312 may be adjusted from depth 641 to depth 642.

With the features described above, various advantages may be achieved. Network packet data stream traffic may be optimized on a per-service-flow basis and buffer bloat may be avoided in some instances by measuring and adjusting the packet buffer queue depths of various network components. Internet service providers (ISPs) may gain a competitive advantage with gamers and other users in some instances by optimizing latency to gaming sites or to gaming applications. Users may subscribe to a network latency optimization service to gain a competitive advantage for online gaming or otherwise enhance their gaming experience.

The various features described above are merely nonlimiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method, comprising:
   determining, by one or more computing devices and based on a service tier associated with a user, a network latency value for a first device and a network latency value for a second device;
   adjusting, based on the network latency value for the first device, a queue associated with the first device; and
   adjusting, based on the network latency value for the second device and a device type of the first device, a queue associated with the second device.

2. The method of claim 1, wherein:
   adjusting the queue associated with the first device comprises adjusting, based on the network latency value for the first device, a minimum packet-buffer-queue depth and a maximum packet-buffer-queue depth of the queue associated with the first device; and
   adjusting the queue associated with the second device comprises adjusting, based on the network latency value for the second device, a minimum packet-buffer-queue depth and a maximum packet-buffer-queue depth of the queue associated with the second device.

3. The method of claim 2, wherein adjusting the minimum packet-buffer-queue depth and the maximum packet-buffer-queue depth of the queue associated with the first device comprises adjusting a packet-buffer-queue depth associated with the service tier.

4. The method of claim 3, wherein each network latency value is based on a maximum latency value for an endpoint-to-endpoint communications path.

5. The method of claim 1, wherein determining the network latency value for the first device comprises determining, based on a device service tier associated with the first device, the network latency value for the first device.

6. The method of claim 1, wherein determining the network latency value for the first device comprises determining, based on the device type of the first device, the network latency value for the first device.

7. The method of claim 1, wherein determining the network latency value for the first device comprises determining, responsive to a determination that a communications link associated with the first device has failed, the network latency value for the first device.

8. The method of claim 1, wherein determining the network latency value for the first device comprises determining, responsive to a determination that a network latency associated with a communications link associated with the first device exceeds a threshold, the network latency value for the first device.

9. A method, comprising:
   adjusting, by a computing device and based on a difference between a requested maximum network latency value and a value indicative of a measured network latency of a network communications path between a computing device of a first type and a computing device of a second type, a minimum packet-buffer-queue depth and a maximum packet-buffer-queue depth of a queue associated with the computing device of the first type to depths determined based on a service tier associated with a user, the second type of computing device being different from the first type of computing device; and
   adjusting, by the computing device and based on the difference, a minimum packet-buffer-queue depth and a maximum packet-buffer-queue depth of a queue associated with the computing device of the second type to depths determined based on the service tier associated with the user.

10. The method of claim 9, further comprising determining the requested maximum network latency value based on the service tier associated with the user.

11. The method of claim 10, wherein the requested maximum network latency value is associated with a service flow, and wherein adjusting the minimum packet-buffer-queue depth and the maximum packet-buffer-queue depth of the queue associated with the computing device of the first type comprises adjusting a queue associated with the service flow.

12. The method of claim 10, wherein adjusting the minimum packet-buffer-queue depth and the maximum packet-buffer-queue depth of the queue associated with the computing device of the first type comprises adjusting, based on a subscription tier associated with the computing device of the first type, at least one of the minimum packet-bufferqueue depth or the maximum packet-buffer-queue depth of the queue associated with the computing device of the first type.

13. The method of claim 10, wherein adjusting the minimum packet-buffer-queue depth and the maximum packet-buffer-queue depth of the queue associated with the computing device of the first type comprises adjusting, responsive to at least one of a determination that a communications link associated with the computing device of the first type has failed or a determination that a network latency associated with the communications link exceeds a threshold, at least one of the minimum packet-buffer-queue depth or the maximum packet-buffer-queue depth of the queue associated with the computing device of the first type.

14. An apparatus comprising:
   a processor;
   a memory storing computer-executable modules comprising:
      an application manager configured to determine a requested network latency based at least on a service tier subscribed to by a user;
      a packet queue manager configured to determine an adjusted latency value based on the requested network latency and a measured network latency of a link of a network that interfaces a communication interface of a first device and a communication interface of a second device; and
      a policy manager configured to transmit instructions adjusting, based on the adjusted latency value, a queue associated with the first device and a queue associated with the second device.

15. The apparatus of claim 14, wherein the transmitted instructions further adjust, based on a difference between a value associated with the requested network latency and a value associated with the measured network latency, the queue associated with the first device.

16. The apparatus of claim 15, wherein the transmitted instructions further adjust, based on the difference, the queue associated with the second device.

17. The apparatus of claim 14, wherein the policy manager is further configured to readjust the queue associated with the first device responsive to a change in the measured network latency.

18. The apparatus of claim 14, wherein the transmitted instructions adjust responsive to at least one of a determination that a different link of the network has failed or a determination that a network latency measurement associated with the first device exceeds a threshold.

19. The apparatus of claim 14, wherein the transmitted instructions further adjust at least one of a minimum packet-buffer-queue depth or a maximum packet-buffer-queue depth of the queue associated with the first device.

20. The apparatus of claim 14, wherein the transmitted instructions further adjust at least one of a minimum packet-buffer-queue depth or a maximum packet-buffer-queue depth of the queue associated with the second device.

* * * * *

UNITED STATES PATENT AND TRADEMARK OFFICE
CERTIFICATE OF CORRECTION

PATENT NO. : 9,998,383 B2  
APPLICATION NO. : 14/880700  
DATED : June 12, 2018  
INVENTOR(S) : Garcia et al.

Page 1 of 1

It is certified that error appears in the above-identified patent and that said Letters Patent is hereby corrected as shown below:

In the Specification

Column 9, Detailed Description, Line 55:  
Please delete "manger" and insert --manager--

Column 10, Detailed Description, Line 45:  
Delete "server" and insert --manager--

Signed and Sealed this  
Twenty-fifth Day of December, 2018

Andrei Iancu  
*Director of the United States Patent and Trademark Office*